Feb. 24, 1953 M. SPARKS 2,629,672

METHOD OF MAKING SEMICONDUCTIVE TRANSLATING DEVICES

Filed July 7, 1949

INVENTOR
M. SPARKS
BY
ATTORNEY

Patented Feb. 24, 1953 2,629,672

UNITED STATES PATENT OFFICE 2,629,672

METHOD OF MAKING SEMICONDUCTIVE TRANSLATING DEVICES

Morgan Sparks, Summit, N. J., assignor to Bell Telephone Laboratories, Incorporated, New York, N. Y., a corporation of New York Application July 7, 1949, Serial No. 103,474

8 Claims. (Cl. 117—37)

This invention relates to semiconductor translating devices and methods of making such devices. More particularly, it relates to methods of making signal translating devices, such as photoelectric cells and rectifiers of the general type disclosed in the application, Serial No. 638,351, filed December 29, 1945 of J. H. Scaff and H. C. Theuerer now Patent No. 2,602,211, and in Patents 2,402,661 and 2,402,662 granted June 25, 1946 to R. S. Ohl and to amplifiers of the general type disclosed in application, Serial No. 35,423, filed June 26, 1948 of W. Shockley, now Patent 2,569,347, granted September 25, 1951 which include a body of semiconductive material having therein two contiguous zones of opposite conductivity type.

One object of this invention is to facilitate the production of semiconductive bodies, for example of germanium or silicon, having therein a junction between two zones of opposite conductivity type.

Another object of this invention is to produce such junctions which are rectifying, photovoltaic, sharply defined and mechanically strong.

In accordance with one feature of this invention, a body of semiconductive material is fabricated by casting together two elements of the material of opposite conductivity type under controlled environmental conditions to produce two zones of opposite conductivity type meeting at a clearly defined junction.

In one illustrative embodiment of this invention, a body of germanium is fabricated by dropping a globule of molten germanium of P conductivity type upon a heated base of N conductivity type in a vacuum or an inert atmosphere, such as helium. The temperatures involved are made such, consistent with the masses of the N- and P-type elements, that the molten P-type globule adheres to the N-type base and upon cooling of the combination a PN junction substantially free of strains is produced. In some cases, for example where the base is of high back voltage N conductivity type germanium, during the casting operation the N-type material may be converted in part to P-type. It may be reconverted to the desired N-type without altering the junction, by an appropriate heat treatment of the body described in detail hereinafter.

The invention and above-noted and other features thereof will be understood more clearly and fully from the following detailed description with reference to the accompanying drawing in which.

Figure 1:
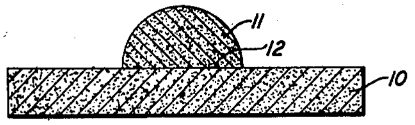
Fig. 1 is an elevational view of a semiconductor body constructed in accordance with this invention.

Referring now to the drawing, the semiconductive body illustrated in Fig. 1 comprises a base or slab 10 of one conductivity type and a body 11 of the opposite conductivity type fused to the body 10 and defining a photovoltaic rectifying junction 12 therewith. Both the base 10 and body 11 may be of the same semiconductive material, for example germanium or silicon, or they may be of different semiconductive materials. Germanium of both conductivity types may be produced in the manner disclosed in the application, Serial No. 638,351, referred to hereinabove. Silicon of either conductivity type may be produced, for example, in the manner described in the application, Serial No. 793,744, filed December 24, 1947 of J. H. Scaff and H. C. Theuerer, now Patent No. 2,567,970.

Figure 2:
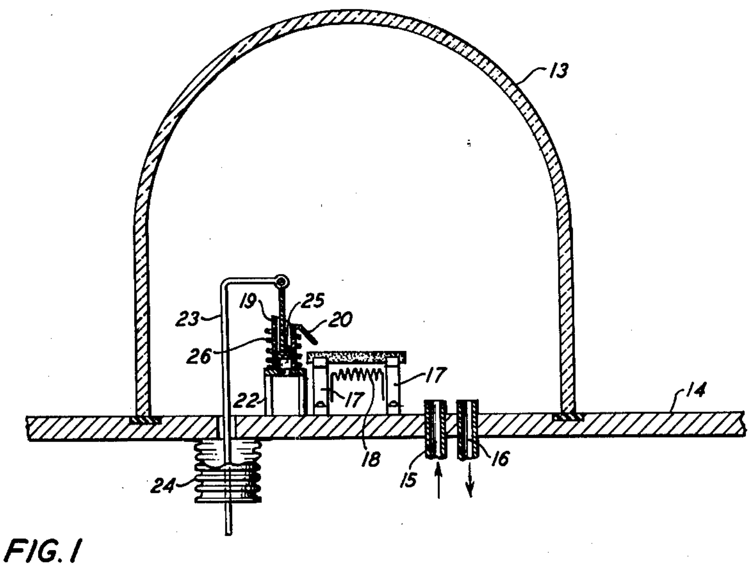
Fig. 2 is an elevational view in section of one form of apparatus which may be utilized in fabricating semiconductor bodies in accordance with this invention.
Figure 3:
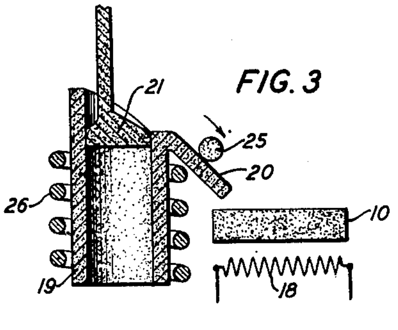
Fig. 3 is a detail sectional view illustrating one manner in which in the apparatus illustrated in Fig. 2 the molten globule may be dropped upon the base.

The body 10, 11, 12 may be produced in one way in apparatus illustrated in Figs. 2 and 3 and comprising a bell jar 13 seated upon and sealed to a base 14. The latter has therein ports 15 and 16 by way of which the bell jar may be evacuated or an inert gas, such as helium, may be introduced or circulated. The base or slab 10 is seated upon refractory supports 17 on the base 14 and may be heated to a prescribed temperature by a heater filament 18. Also supported from the base 14 is a crucible 19, for example of graphite, having a chute-like lip 20 terminating opposite one face of the slab 10. The crucible, which may be mounted by a support 22, comprises also a base 21 which may be raised or lowered by a linkage 23 coupled to a bellows 24 joined to the base 14. A charge 25 rests upon the base 21 and the latter slopes towards the lip 20 so that when the base is raised, as illustrated in Fig. 3, the charge will flow to and along the lip. The charge may be melted as by an induction heating coil 26 encompassing the crucible 19.

In the fabrication of the semiconductive body, the charge 25 is heated so that it melts and the base 21 is then raised whereby a blobule of the molten semiconductive charge flows down the lip 20 and drops upon the base 10. The temperatures of the base 10 and the molten globule are correlated so that the globule adheres to the base 10 and upon cooling solidifies thereon without the introduction of deleterious thermal strains in the base. The exact temperatures to be employed in any particular instance will be dependent upon the relative masses of the base 10 and the globule 25 and the atmosphere within the bell jar 13. In an illustrative case resulting in a clearly defined, mechanically strong junction 12, the bell jar may be evacuated to a vacuum of $1\times10^{-5}$ millimeter of mercury and the charge may be 0.3 gram of P-type germanium material containing .005 per cent aluminum and heated to 1150° C. The base 10 may be .05 centimeter thick and one centimeter square of high back voltage N-type germanium and heated to 375° C. The resulting PN junction 12 has an area of about 0.1 square centimeter.

In some cases, as a result of the casting the N-type material of the base 10 may be converted wholly or partly to P-type. It may be reconverted to N-type after cooling of the body 10, 11 by heating the body at about 500° C. for about 24 hours in an inert atmosphere. The product then is a semiconductive body of the configuration illustrated in Fig. 1 having therein a clearly defined photovoltaic, rectifying PN junction 12.

Figure 4:
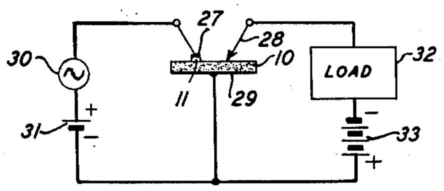
Fig. 4 is a circuit schematic illustrating one signal translating device including a semiconductor body of the construction illustrated in Fig. 1.

Such a body may be utilized as a photocell or a rectifier, electrical connections being made in both cases to the base 10 and the body 11 fused thereto. It may be utilized also in semiconductive amplifiers. One such amplifier, which is of the general configuration described in the application, Serial No. 33,466 filed June 17, 1948, of J. Bardeen and W. H. Brattain now Patent 2,524,035, granted October 3, 1950, is illustrated in Fig. 4. The body 11 to which an ohmic connection 27, which may be a plating of rhodium, is made constitutes the emitter. A point contact 28 bears against the body 10 in immediate proximity to the body 11 and constitutes the collector of the device. A third and ohmic connection 29, which also may be a plating of rhodium, is made to the face of the base 10 opposite the emitter and collector. The input circuit including the signal source 30 and a biasing source 31 is connected between the emitter 11, 27 and the base 29. The output circuit comprising the load 32 and the biasing source 33 is connected between the collector 28 and the base 29. The emitter advantageously is biased in the forward direction, for example of the order of one volt or less. The collector is biased in the reverse direction, for example at a voltage of the order of 10 to 100 volts. Amplified replicas of the input signals from the source 30 appear across the load 32.

The body 11 may be utilized also as the collector and the point contact 28 as the emitter. In this application, the input and output circuits as illustrated in Fig. 4 will be reversed.

Figure 5:
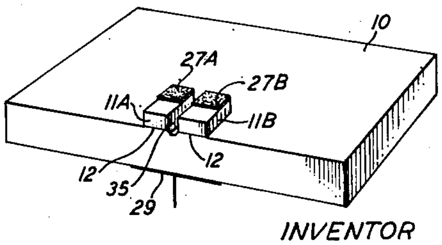
Fig. 5 is a perspective view of a semiconductor body constructed in accordance with this invention and particularly suitable for use in an amplifier.

Also, two bodies 11 of one conductivity type fused to a base 10 of the opposite conductivity type may be utilized, one serving as the emitter and the other as the collector. One typical construction is illustrated in Fig. 5 and may be fabricated from a body of the form illustrated in Fig. 1 and constructed in the manner described hereinabove. Specifically, the body 11, for example of P-type germanium, is divided by a saw cut, for example of the order of .002 inch wide, into two parts 11A and 11B to which ohmic connections 27A and 27B, such as rhodium platings, are made. The saw cut or slot 35 extends through the junctions 12 between the base 10 and the bodies 11A and 11B thereby to form two P-type elements upon an N-type germanium base, each element forming a PN junction with the base.

The semiconductive body illustrated in Fig. 5 may be operated as an amplifier in the circuit illustrated in Fig. 4 with the body 11A serving as the emitter and body 11B taking the place of the collector 28 of Fig. 4.

Although specific embodiments of this invention have been shown and described, it will be understood that they are but illustrative and that various modifications may be made therein without departing from the spirit and scope of this invention.

What is claimed is:

1. The method of making a semiconductive body for translating devices which comprises dropping a globule of molten semiconductive material selected from the group consisting of germanium and silicon and of one conductivity type upon a body of semiconductive material selected from the group consisting of germanium and silicon and of the opposite conductivity type, in an oxygen free atmosphere, and cooling the unit thus formed.

2. The method of making a semiconductive body for translating devices which comprises dropping a molten globule of semiconductive material selected from the group consisting of germanium and silicon and of one conductivity type upon a base of semiconductive material selected from the group consisting of germanium and silicon and of the opposite conductivity type, in an inert atmosphere, and cooling the globule-base unit.

3. The method of making a semiconductive body for translating devices which comprises dropping a globule of molten P conductivity type semiconductive material selected from the group consisting of germanium and silicon, upon a heated body of N conductivity type material selected from the group consisting of germanium and silicon, in an oxygen free atmosphere, and cooling the unit thus formed.

4. The method of making a semiconductive body for translating devices which comprises dropping a molten globule of P-type germanium upon a heated base of N-type germanium in an oxygen free atmosphere, and cooling the globule base unit.

5. The method of making a semiconductive body for translating devices which comprises dropping a globule of molten P conductivity type semiconductive material selected from the group consisting of germanium and silicon, upon a heated body of N conductivity type material selected from the group consisting of germanium and silicon, in an oxygen free atmosphere, cooling the globule base unit, and heating the unit thus formed to reconvert to N-type any of the initially N-type material that had been converted to P-type.

6. The method of making a semiconductive body for translating devices which comprises dropping a molten globule of P-type silicon upon a heated base of N-type silicon in an oxygen free atmosphere, and cooling the globule base unit.

7. The method of making a semiconductive body for translating devices which comprises dropping a molten globule of P-type germanium at a temperature of about 1150° C. upon a base of N-type germanium at a temperature of about 375° C., in a vacuum, and cooling the globule base unit.

8. The method of making a semiconductive body for translating devices which comprises dropping a globule of about 0.3 gram of P-type germanium at a temperature of about 1150° C. upon a face of a slab of about 1.0 centimeter square by 0.15 centimeter thick N-type germanium at a temperature of about 375° C., and in an oxygen free atmosphere, cooling the unit thus formed, and heating said unit at about 500° C. for about 24 hours.

MORGAN SPARKS.

REFERENCES CITED

The following references are of record in the file of this patent:

UNITED STATES PATENTS

| Number | Name | Date |
|---|---|---|
| 2,109,879 | De Boer | Mar. 1, 1938 |
| 2,140,994 | Gorlich | Dec. 20, 1938 |
| 2,402,661 | Ohl | June 25, 1946 |